US011038730B2

(12) United States Patent
Krunz et al.

(10) Patent No.: US 11,038,730 B2
(45) Date of Patent: Jun. 15, 2021

(54) METHOD FOR EXPLOITING PREAMBLE WAVEFORMS TO SUPPORT DEVICE AND NETWORK FUNCTIONALITIES IN WIRELESS SYSTEMS

(71) Applicant: ARIZONA BOARD OF REGENTS ON BEHALF OF THE UNIVERSITY OF ARIZONA, Tucson, AZ (US)

(72) Inventors: Marwan M. Krunz, Tucson, AZ (US); Hanif Rahbari, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/486,635

(22) PCT Filed: Feb. 16, 2018

(86) PCT No.: PCT/US2018/000062
§ 371 (c)(1),
(2) Date: Aug. 16, 2019

(87) PCT Pub. No.: WO2018/222226
PCT Pub. Date: Dec. 6, 2018

(65) Prior Publication Data
US 2020/0235975 A1 Jul. 23, 2020

Related U.S. Application Data

(60) Provisional application No. 62/459,886, filed on Feb. 16, 2017.

(51) Int. Cl.
*H04L 27/26* (2006.01)
*H04J 13/00* (2011.01)
(Continued)

(52) U.S. Cl.
CPC ...... *H04L 27/2613* (2013.01); *H04J 13/0062* (2013.01); *H04L 5/0007* (2013.01);
(Continued)

(58) Field of Classification Search
CPC .............. H04L 5/0048; H04L 27/2601; H04L 27/2602; H04L 5/0007
(Continued)

(56) References Cited

U.S. PATENT DOCUMENTS

2003/0078023 A1* 4/2003 Vaidyanathan ..... H04L 25/0228
455/296
2005/0220209 A1* 10/2005 Lewis ................. H04L 25/0226
375/267
(Continued)

FOREIGN PATENT DOCUMENTS

WO 2018222226 A1 12/2018

OTHER PUBLICATIONS

International Search Report Issued For PCT Application No. PCT/US2018/000062 dated Dec. 6, 2018.

*Primary Examiner* — Shuwang Liu
*Assistant Examiner* — Gina M McKie
(74) *Attorney, Agent, or Firm* — Nguyen Tarbet LLC (57) ABSTRACT

The frame preamble in current wireless systems is designed to facilitate various PHY-layer functions, including frequency offset estimation and frame detection. However, this preamble is assumed to be constant and is seldom used to convey any frame-specific bits. Embedding information into the preamble can open the door for new PHY-layer applications. P-modulation, a method that enables an OFDM-based wireless transmitter to embed frame-specific bits into the frame preamble to accomplish PHY-layer applications (while remaining backward-compatible with legacy receivers), is presented.

9 Claims, 3 Drawing Sheets

(51) Int. Cl.
  *H04L 5/00* (2006.01)
  *H04L 27/18* (2006.01)
(52) U.S. Cl.
  CPC .......... *H04L 27/18* (2013.01); *H04L 27/2657* (2013.01); *H04L 27/2675* (2013.01)
(58) Field of Classification Search
  USPC ........................................................ 375/260
  See application file for complete search history.

(56) References Cited

U.S. PATENT DOCUMENTS

| | | | |
|---|---|---|---|
| 2005/0243940 A1* | 11/2005 | Huh | H04L 25/0226 375/260 |
| 2005/0286474 A1* | 12/2005 | van Zelst | H04L 27/261 370/334 |
| 2010/0080310 A1 | 4/2010 | Moffatt et al. | |
| 2011/0211594 A1 | 9/2011 | Van Nee | |
| 2014/0204809 A1 | 7/2014 | Kim et al. | |
| 2014/0269667 A1 | 9/2014 | Teague et al. | |

* cited by examiner

United States Patent US 11,038,730 B2

METHOD FOR EXPLOITING PREAMBLE WAVEFORMS TO SUPPORT DEVICE AND NETWORK FUNCTIONALITIES IN WIRELESS SYSTEMS

CROSS REFERENCE

This application is a 371 of PCT/US18/00062 filed Feb. 16, 2018, which claims priority to U.S. Provisional Patent Application No. 62/459,886, filed Feb. 16, 2017, the specification(s) of which is/are incorporated herein in their entirety by reference.

GOVERNMENT SUPPORT

This invention was made with government support under Grant No. CNS1409172 awarded by NSF and Grant No. W911NF-13-1-0302, awarded by ARMY/ARO. The government has certain rights in the invention.

FIELD OF THE INVENTION

The present invention relates to the modification of a preamble (a.k.a. sync sequence) in an OFDM system to provide a user the ability to embed bits that can facilitate new PHY-layer functionalities, and to increase security against jamming.

BACKGROUND OF THE INVENTION

The frame preamble (sync sequence) in current WiFi systems is designed to facilitate various PHY-layer functions, including frequency offset estimation and frame detection. However, this preamble is assumed to be constant and is never used to convey any frame-specific bits. Embedding information into the preamble can open the door for several new PHY-layer applications. For example, the PHY header no longer needs to be transmitted at a known (the lowest) rate if its rate is announced earlier in the preamble. A full duplex transmitter can use the embedded information to inform other devices of its current operation mode (e.g., transmit/receive vs. transmit/sense), obviating the need far additional control packets. In security applications, a PHY-layer sender identifier can be embedded in the preamble, facilitating PHY level encryption.

However, modifying the standard preamble to embed bits can interrupt the operation of existing devices. Presently, P-modulation, a method that enables an OFDM-based 802.11a/n/ac transmitter to embed up to 19 frame-specific bits in the frame preamble at the highest reliability required by the system, while remaining backward-compatible with legacy receivers is proposed. Experimental analysis and Universal Software Radio Peripheral ("USRP") based experimental results confirm the practicality of the scheme. The present method also provides insights into designing time-varying preambles in future systems.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In some aspects, the present invention discloses previously undiscovered information-carrying capacity in the structure of the frame preamble of many existing wireless standards, including the OFDM-based 802.11/a/n/ac systems. Such capacity allows a transmitting device to convey additional user-specific information in the preamble of each frame, which can be used to support many device, link, and network functions. This disclosure is leveraged in this invention to develop P-modulation or preamble modulation method, which is both reliable and backward-compatible with the standard supported by the given wireless transmitter and receiver. One of the unique and inventive technical features of the present invention is that conveying the user-specific information (by embedding a bit sequence onto the waveform of the frame preamble) does not require legacy/unaware receivers to update their firmware/hardware to be able to decode the frame payload of a P-modulation-enabled transmitter. That means that the receiver does not need to necessarily change its assumption that the frame preamble has a fixed publicly known value. Furthermore, even if a(n) (unaware) receiver is not be capable of processing the preambles with high dynamic range and peak-to-average power ratio, the preamble generated under P-modulation can still be received and processed. The user-specific embedded bit sequence may represent (parts of) the sender's time-varying digital signature and hence may be used to authenticate the sender or a link and reduce copycat/replay attacks.

Without wishing to limit the invention to any theory or mechanism, it is believed that the technical feature of the present invention advantageously provides for time-varying and phase-shifting versions of a new set of standards-compliant preamble waveforms that change from one frame to another, which mitigates frequency offset (FO) estimation attacks in OFDM systems. More specifically, typical FO estimation attacks rely on a publicly known preamble signal to craft a jamming signal and efficiently disrupt the FO estimation process at the receiver (Rx). By providing a time-varying and phase-shifting preamble waveform, such attacks can be reduced. None of the presently known prior references or work has the unique inventive technical feature of the present invention. Experimentation on 802.11 (Wi-Fi) systems using a Universal Software Radio Peripheral ("USRP") based testbed confirm the effectiveness of the P-modulation method, its practicality, and its backward-compatibility. The results show the capacity of the existing preambles to embed more than 7 user-defined bits, without sacrificing the normal functions of a typical preamble. The present method also provides insights into designing time-varying preambles for future systems, including but not limited to, Wi-Fi systems that conform to the IEEE 802.11ax standard.

In some aspects, the present invention features a method for exploiting a preamble waveform of a frame preamble in an orthogonal frequency-division multiplexing ("OFDM") based wireless system to support protocol and security functions at the physical (PHY) layer by embedding time-varying user-defined information specific to said protocol and security functions into the preamble waveform. In some embodiments, the method may comprise introducing a new approach for creating a dependency pattern as a sequence of phase differences between successive subcarriers of an OFDM symbol; generating a new set of dependency patterns, each pattern being a variation of an initial dependency pattern, wherein the initial dependency pattern is a sequence of phase differences between successive subcarriers of a standardized training signal (TS), wherein several identical versions of these TSs comprise a standardized preamble waveform of a given wireless system; selecting a secondary dependency pattern from a union of the new (disclosed) set of generated dependency patterns and from the initial dependency pattern; identifying a subset of mutually independent dependency patterns that can be used to generate a number of backward-compatible (with respect to a given existing standardized wireless system) TSs, wherein each dependency pattern in the subset is not a function of any other dependency pattern in the same subset; and generating another set of backward-compatible (with respect to a given existing standardized wireless system) TSs by replacing the initial dependency pattern exhibited by the set of standardized TSs with the secondary dependency pattern. Without wishing to limit the present invention, replacing the initial dependency pattern can result in a modified preamble waveform that is backward-compatible with a standardized receiver because the set of backward-compatible TSs adhere to a standardized periodicity requirement and the preamble waveform adheres to a standardized preamble-duration requirement. In some embodiments, the set of backward-compatible TSs have a period and a duration equal to a period and a duration of the set of standardized TSs. The set of backward-compatible TSs can have a peak-to-average-power ratio ("PAPR") and a dynamic range different than a PAPR and a dynamic range of the set of standardized TSs. The PAPR and the dynamic range of the set backward-compatible TSs may be acceptable to the standardized receiver. In some embodiments, each sequence of phase differences comprising the secondary dependency pattern conveys a functionality-specific value that needs to be conveyed in the modified preamble waveform via the set of backward-compatible TSs. The standardized receiver can process and translate the functionality-specific value into a sequence of bits specific to the protocol and security functions defined by user.

According to other embodiments, the present invention features a method of encoding a message into a preamble waveform of a frame preamble in an orthogonal frequency-division multiplexing ("OFDM") based wireless system. In a wireless system, the frame preamble has a set of subcarrier frequencies used to transmit training signals that make up the frame preamble. The training signals are nominally used to allow the receiver to detect the start of a wireless frame, perform automatic gain control and estimate frequency offset. Because of this the frame preamble must conform to certain requirements which facilitate those functions. A standard series of phase offsets between the sequence of training signals is used in a typical wireless standard, referred to as a dependency pattern. In this invention, a specialized set of alternative dependency patterns is used to encode information. This specialized set of alternative dependency patterns produces training signals which conform to the requirements needed by the frame preamble, for any time and phase shift applied to the training signals. By varying the dependency pattern and the phase shift of the training signals, information can be encoded in the frame preamble without violating the preamble requirements. This allows the method to produce signals that are backwards compatible with existing receivers.

In some embodiments, the method comprises selecting a dependency pattern from the predetermined set of dependency patterns that conform to the requirements, where the pattern selected depends on what information is to be encoded. For instance the index of the dependency pattern used may correspond to a binary string which has been converted to a decimal value. A sequence of training signals is generated from the selected dependency pattern.

In some embodiments, a phase rotation is applied to the sequence of training signals. The phase rotation has a discrete set of possible values, where the information encoded in the phase rotation may be a binary number which is converted into a decimal index into the set of possible rotations. The set of possible phase rotations may be determined by the resolution that the demodulation process at the receiver is capable of. In other embodiments, the training signals are then transmitted on the corresponding subcarriers to produce the frame preamble. By repeating this process over successive frames an information message can be encoded in the frame preambles of a wireless system.

BRIEF DESCRIPTION OF THE DRAWINGS

The features and advantages of the present invention will become apparent from a consideration of the following detailed description presented in connection with the accompanying drawings in which.

DETAILED DESCRIPTION OF THE INVENTION

Figure 1:
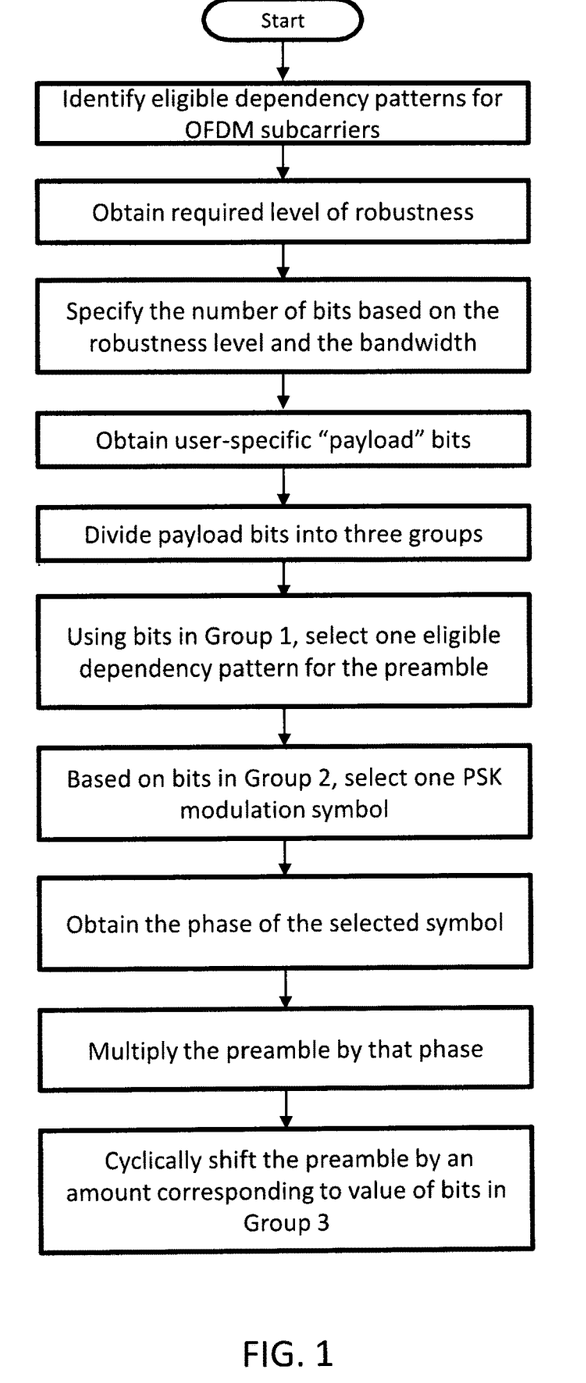
FIG. 1 shows a flowchart of an exemplary flow of the present invention.
Figure 2:
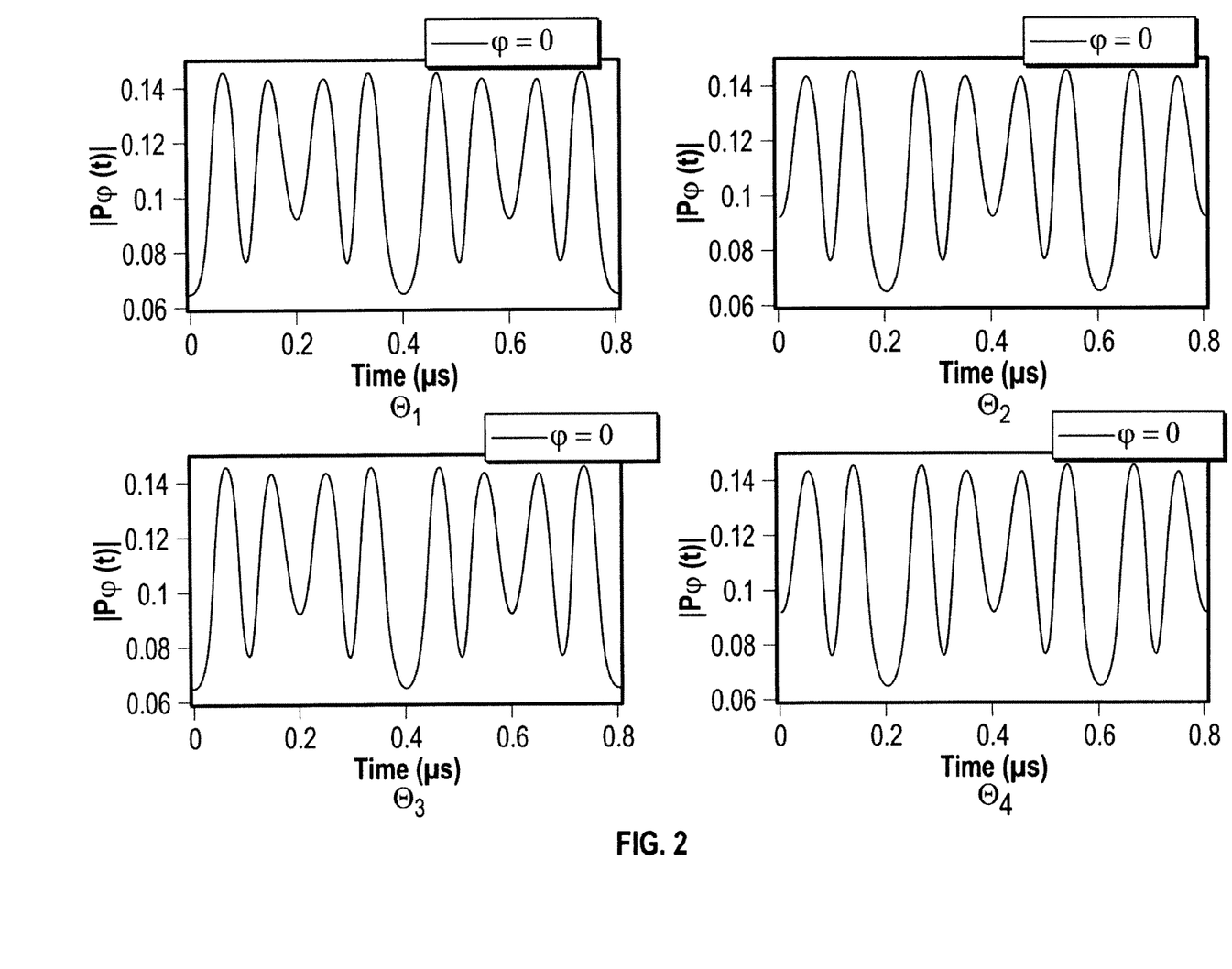
FIG. 2 shows amplitudes of the four STFs generated using the patterns in Table II (only one STF is shown).
Figure 3:
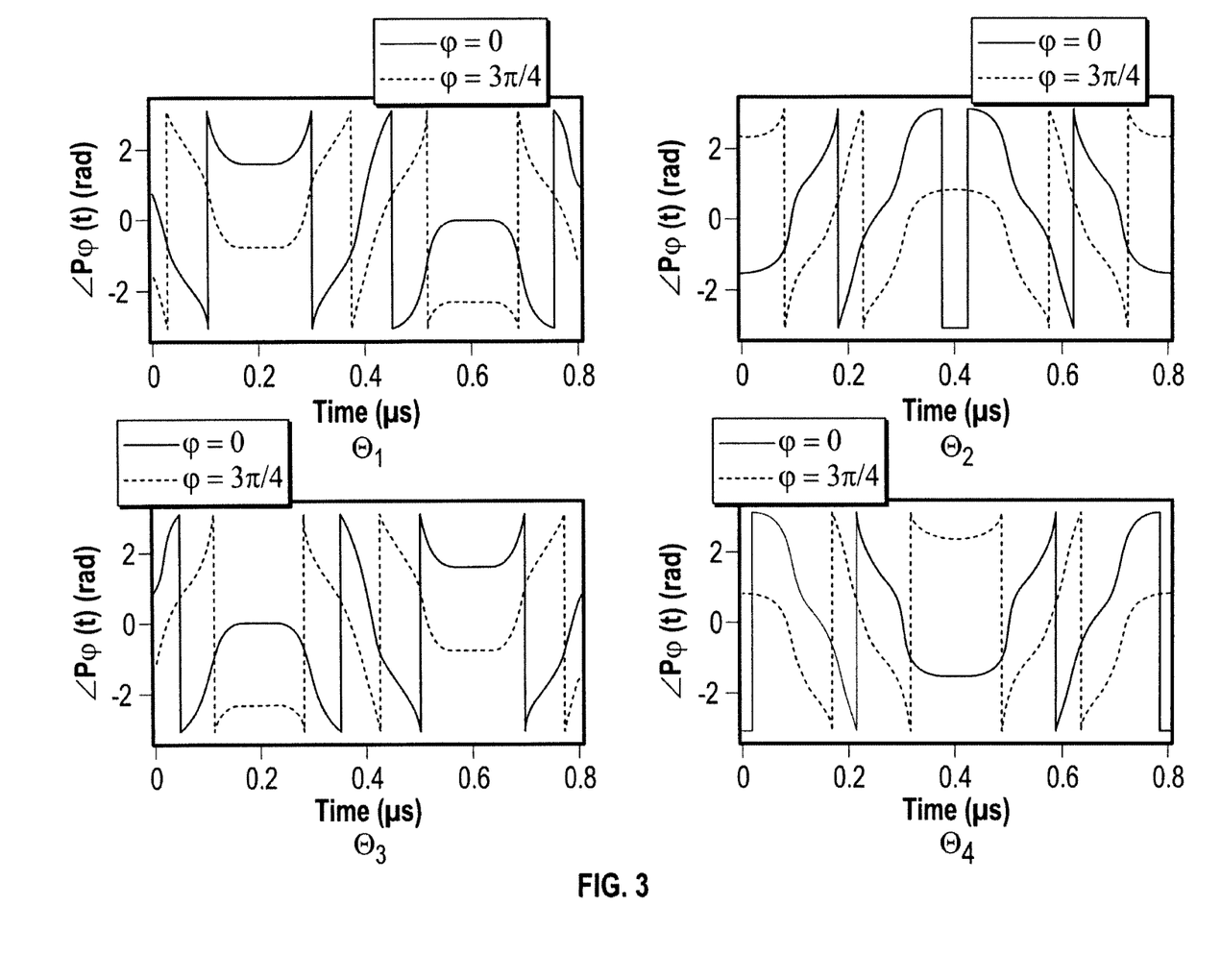
FIG. 3 shows phases of the four STFs generated using the patterns in Table II (only one STS is shown).

Referring now to FIGS. 1-3, the present invention features a method for exploiting a preamble waveform of a frame preamble in an orthogonal frequency-division multiplexing ("OFDM") based wireless system to support protocol and security functions by embedding a sequence of bits, specific to said protocol and security functions, into the preamble waveform. The preamble waveform may comprise a set of standardized identical training signals ("TSs") exhibiting an initial dependency pattern. A dependency pattern is a sequence of phase differences between successive subcarriers comprising each standardized TS. In some embodiments, the method comprises generating a set of dependency patterns (each different from the initial dependency pattern) and selecting a secondary dependency pattern from the union of the set of dependency patterns generated and the initial dependency pattern. Next, a set of backward-compatible TSs may be generated by replacing the initial dependency pattern with the secondary dependency pattern. Replacing the initial dependency pattern results in a modified preamble waveform that is backward-compatible with a standardized receiver. Backward compatibility is achieved because the set of backward-compatible TSs adhere to a periodicity requirement and the preamble waveform adheres to a preamble-duration requirement.

In other embodiments, wherein the set backward-compatible TSs have the same period and duration as the set of standardized TSs. Additionally, the set of backward-compatible TSs have a peak-to-average-power ratio ("PAPR") and a dynamic range different than the set of standardized TSs, but acceptable to the standardized receiver. Further, the sequence of phase differences comprising the initial or one of the secondary dependency patterns conveys a function-specific value embedded in the modified preamble waveform via the set of backward-compatible TSs. Thus, the standardized receiver is able to process and translate the function-specific value into the sequence of bits specific to the protocol and security functions to perform user-defined network and protocol operation.

In further embodiments each TS in the backward-compatible preamble waveform is phase-shifted by a common phase value. This phase-shift embeds an additional user-specified value into the preamble waveform. Moreover, each backward-compatible TS may be time-shifted by a common time value, wherein the common time value also conveys user-specified value into the preamble waveform. Thus, in combination, sequences of bits may be embedded in the preamble waveform in three different ways: selecting one of the backward-compatible dependency patterns for the TSs (including the initial dependency pattern), phase shifting a set of (standardized or secondary) TSs, and time-shifting a set of (standardized or secondary) TSs. These three modulation methods may performed individually or in combination.

In alternate embodiments, the OFDM-based wireless system is a multiple-input multiple-output ("MIMO") based wireless system, where the frame preamble comprises one or more sets of standardized TSs. In other embodiments, the OFDM-based wireless system is an IEEE 802.11 wireless system, where each standardized TS is a short-training sequence ("STS"), and the first half of the preamble waveform comprises a short training field ("STF") comprising 10 STSs.

Supplementary embodiments feature the OFDM-based wireless system as a Long Term Evolution ("LTE") system. Here, the standardized TS is a primary synchronization signal ("PPS") used to identify a cell identity using a frequency-domain Zadoff-Chu sequence. The cell identity is an identifier of a physical LTE cell and the Zadoff-Chu sequence exhibits a zero cyclic autocorrelation at all nonzero lags. A set of backward-compatible PPSs are generated by cyclic-shifting the standardized PPS in time and/or frequency. A standardized receiver is able to apply its normal procedure to extract the physical cell identity.

The present invention further comprises a method for extracting the sequence of bits embedded into the modified preamble waveform. In some embodiments, the method comprises detecting the (initial or secondary) dependency pattern of the modified preamble waveform. The dependency pattern belongs to a cluster of dependency patterns ("CDP") containing a plurality of dependency patterns that can be converted to each other by adding a common constant (in radians). All dependency patterns of a CDP are time-shifted versions of one another. To detect the secondary dependency pattern, a correlation among subcarriers of a TS is exploited. The estimation is enhanced using the repetitions of TSs within the modified preamble waveform. The underlying CDP reveals the first part of the sequence of embedded bits. Further, the plurality of dependency patterns belonging to the CDP are ordered and indexed according to an amount of time shift. An index of the detected dependency pattern in the underlying CDP reveals the second part of the bit sequence. Next, the amount of phase shift is detected. An estimation uses an estimated dependency pattern as a basis for the expected phase of each subcarrier comprising the set of backward-compatible TSs. This estimation uses repetitions of the phase shift in the subcarriers of each backward-compatible TS and is enhanced using repetitions of TSs.

Example—OFDM-Based IEEE 802.11 Frame

A non-limiting example of an application, in IEEE802.11 based systems, of P-modulation will be presently discussed (as detailed in *Frame Preamble Waveforms to Support New Physical-layer Functions in OFDM-based 802.11 Systems*, Rahbari and Krunz, which is incorporated herein in its entirety). P-modulation modulates (embeds) a bit sequence in the STF of a preamble at the transmitter ("Tx") and then demodulates (extracts) this sequence at the receiver ("Rx") with low complexity and very little impact on normal preamble functions (for backward compatibility with legacy receivers). P-modulation maintains all the STF requirements but modifies other properties of the STF.

Modulating a bit sequence is different from conventional digital modulation, where every element in the sequence of modulated symbols is determined independently by one or multiple input bits. Instead, a particular "chain" of correlated symbols, S, is used to modulate a bit sequence. The correlation among symbols in S is imposed by the peak-to-average power ratio ("$R_{PAP}$") and dynamic range ("$R_{DR}$") requirements for IEEE 802.11 based systems. In the following, a signal is STF-compliant if it satisfies all the requirements for IEEE 802.11 based systems. The number of distinct STF-compliant signals determines the number of different bit sequences that can be embedded in the STF.

To construct a set of STF-compliant sequences, different dependency patterns among the symbols in S of known compliant signals are identified. Using those patterns, two signal processing techniques are employed to generate as many compliant signals as possible. Here, a dependency pattern is defined as the sequence of (wrapped) phase differences between the successive symbols in S. Let $\theta_i$ represent the ith phase difference and let $\Theta=(\theta_1, \ldots, \theta_{11})$ represent a dependency pattern in S starting from $s_{-6}$. For example, $\theta_1 = \angle(s_{-5}) - \angle(s_{-6})$, where $\angle(.)$ indicates the phase of a complex symbol. Therefore, a set S can be alternatively represented using its $s_{-6}$ and associated $\Theta$, as follows:

$$s_i = \begin{cases} e^{j\theta_{i+6}} s_{i-1}, & \text{for } i \in [-5, -1] \cup [2, 6] \\ e^{j\theta_{i+6}} s_{i-2}, & \text{for } i = 1 \end{cases} \quad (1)$$

Through exhaustive search among all 412 sequences that only consist of QPSK symbols, 16 STF-compliant signals were identified. Each of the QPSK symbols appears as the value of $s_{-6}$ in four of these signals. Further recognized were four distinct dependency patterns for each $s_{-6}$ value: $\Theta_1, \ldots, \Theta_4$, each corresponding to one of the four possible values for $\theta_1$ (see Table II). For example, the dependency pattern of the sequence in Table I is $\Theta_3$. ($\theta_i$'s also depend on $\theta_1$.)

The fact that if the symbols transmitted on the subcarriers of an OFDM symbol are all shifted in phase by the same amount, then the period, the RPAP, and the RDR of that OFDM symbol do not change is used to design more compliant signals using the same dependency patterns $\theta_i$, $i=1, \ldots, 4$. Hence, higher-order PSK symbols as $s_{-6}$ can be used. To illustrate, let $\varphi$ be the phase shift of the elements in S and $P_\varphi(t)$ be the new STF after this shift. Then, $$P_{100}(t) = e^{j\varphi} P(t). \quad (2)$$

Multiplying a signal by a constant coefficient does not change the ratio of the maximum and minimum amplitude of the signal (i.e., the $R_{DR}$) or the ratio of the maximum and the root mean-square of the signal (i.e., the $R_{PAP}$). So the Tx can select any phase for $s_{-6}$ and the same amplitude of √2, follow one of the patterns $\theta_i$, $i=1, \ldots, 4$, to define the rest of the symbols in S, and generate a STF-compliant signal.

TABLE I

SEQUENCE OF QPSK-MODULATED SYMBOLS USED TO GENERATE STF IN 802.11 A/G [3].
$|s_{-6}| = |s_{-5}| = \ldots = |s_6| = \sqrt{2}$. THIS SEQUENCE IS THEN MULTIPLIED BY $\sqrt{13/6}$ TO
NORMALIZE THE AVERAGE POWER OF THE RESULTING SYMBOLS.

| | $s_i$ | | | | | | | | | | | |
|---|---|---|---|---|---|---|---|---|---|---|---|---|
| | $s_{-6}$ | $s_{-5}$ | $s_{-4}$ | $s_{-3}$ | $s_{-2}$ | $s_{-1}$ | $s_1$ | $s_2$ | $s_3$ | $s_4$ | $s_5$ | $s_6$ |
| Value | 1 + j | −1 − j | 1 + j | −1 − j | −1 − j | 1 + j | −1 − j | −1 − j | 1 + j | 1 + j | 1 + j | 1 + j |

TABLE II

DEPENDENCY PATTERNS AMONG ALL POSSIBLE COMBINATIONS OF
QPSK-MODULATED SYMBOLS IN S THAT SATISFY THE STF REQUIREMENTS.
THE IEEE STANDARD USES THE DEPENDENCY PATTERN $\Theta_3$ AND $\varphi = 0$ WHEN $s_{-6} = 1 + j$.

| | $\theta_i$ | | | | | | | | | | | |
|---|---|---|---|---|---|---|---|---|---|---|---|---|
| | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ | $\theta_{11}$ | $b_2 b_1$ |
| i = 1 | 0 | 0 | 0 | π | 0 | π | π | 0 | π | π | π | 00 |
| i = 2 | π/2 | π/2 | π/2 | −π/2 | π/2 | 0 | −π/2 | π/2 | −π/2 | −π/2 | −π/2 | 01 |
| i = 3 | π | π | π | 0 | π | π | 0 | π | 0 | 0 | 0 | 11 |
| i = 4 | −π/2 | −π/2 | −π/2 | π/2 | −π/2 | 0 | π/2 | −π/2 | π/2 | π/2 | π/2 | 10 |

FIG. 2 shows the amplitudes of the STF-compliant signals, constructed by using two different values for φ and one of the four dependency patterns $\Theta_1$ to $\Theta_4$. These figures also show that $P_\varphi(t)$ and $P(t)$ with the same dependency pattern have the same envelope. Hence, amplitude based STF functions (e.g., frame detection and FO estimation) will not be impacted by the phase shift. The specific selection of the dependency pattern $\Theta_3$ in the IEEE 802.11 standards is with respect to cross-correlation-based detection issues (e.g. matched filter performance in the boundary region between the STF and the LTF). However, by using the autocorrelation method for frame detection at the Rx, those issues will not be binding for the present scheme.

The coefficient $e^{j\varphi}$ rotates the constellation map of the symbols in S by φ degrees. Therefore, the set of $s_{-6}$ values that can be used to generate STF-compliant signals consists of the symbols of a PSK modulation scheme. The order of this modulation scheme, denoted by M, depends on the performance of the PSK demodulation operation and the accuracy of pattern detection, as well as the accuracy of channel state information ("CSI") and frequency offset ("FO") estimation. The order specifies how many bits can be modulated using different constellation rotations when using the same pattern. These $\log_2 M$ bits as rotation bits are referred to as rotation bits. The Rx can exploit the correlation among the symbols in S and use all of them to improve the demodulation accuracy. However, incorrect detection of the underlying pattern may significantly change the expected sequence of phases. This can be seen in FIG. 3, where the phases of the signals in FIG. 2 are plotted.

To identify even more STF-compliant signals, the fact that the patterns in Table II are indeed not independent and a pattern $\Theta_i$ can be obtained by adding a multiple of π/2 to $\Theta_1$ (for $\theta_6$ a multiple of 7 should be added). For example, $\Theta_2 = \Theta_1 + \pi/2$. In other words, when the phase differences between successive symbols of the frequency subcarriers are changed by a constant, the resulting signal remains an STF-compliant signal. To explain, adding a constant to $\Theta_i$ in the frequency domain has an interpretation in the time domain. In OFDM systems, a time shift in the signal results in a linear phase shift in the symbols along the ordered subcarriers, and vice versa. Because the elements in S are ordered by their frequencies, such a linear shift brings about the same change in phase differences $\theta_i$, i=1, . . . , 11. This amount of change is indeed the slope of a line that defines a symbol's phase shift with respect to its frequency. Now let N be the number of samples in a symbol and v be the line slope. The corresponding time shift $t_s$ (in terms of the number of samples) is $t_s = (N \times v)/2\pi$. For example, the dependency patterns in Table II represent different amounts of time shift of the same signal, as shown in FIG. 2. Note that cyclic time shifts in a periodic signal do not change its dynamic range and PAPR.

Therefore, other sets of STF-compliant signals can be generated by shifting in time a compliant signal, or equivalently, using different dependency patterns $\Theta^{(v)} = \Theta_1 + v$, $v \in [-\pi, \pi]$. For example, $\Theta_2$ in Table II can be represented by $\Theta^{(\pi/2)}$. A time shift, however, impacts the frame detection accuracy because the last few samples in the new STF signals can have higher amplitudes than the ones in the standardized STF. This will inflate the noise samples located before the true start of the frame during the frame detection when the autocorrelation window includes a few of them. We exploit the LTF to account for such errors.

It is noted that using different dependency patterns with the same φ is equivalent to a form of frequency-domain differential PSK (FD-DPSK), which is robust to channel phasor and FO estimation errors (i.e., a non-coherent scheme). The number of different dependency patterns in the present scheme, denoted by Q, depends on the target performance of the demodulator and the frame detection accuracy. With the same φ, $\log_2 Q$ bits can be encoded. An example is shown in Table II for Q=4. In P-modulation, the assignment of bits to patterns and phase shifts follows the Gray Coding rule.

Altogether, the Tx can embed the total of $\log_2 M + \log_2 Q$ bits in the STF by simultaneously using the proposed time shift and phase rotation techniques. These techniques maintain the period, RPAP, and RDR of the standard STF, but change (1) the amount of phase difference between successive frequency domain symbols of an STS, and (2) the phase of the first frequency-domain symbol in the identical STSs.

The following expression is a representation of the entire bit sequence that would be modulated using P-modulation, where $b_i$ denotes the $i^{th}$ bit:

$$[\underbrace{b_{logMQ}, \ldots, b_{1+logQ}}_{\varphi} \ \underbrace{b_{logQ}, \ldots b_1}_{v}] \quad (3)$$

The bit sequence consists of all the bits that are modulated by rotation (parameter $\varphi$) and the dependency pattern (parameter $v$). While in general the bits can appear in any order, in this representation we group the bits depending on the technique that is used to modulate them.

Noncompliant but Possible STF Waveforms

In the present scheme, all the STF requirements, including RPAP≤2.24 dB and RDR≤7.01 dB, are met. However, modern wireless devices are capable of processing signals with higher RPAP and RDR values. For example, COTS wireless routers usually support RDR>100 dB. This paves the way to expand the set $\Theta$ and include several new patterns by identifying STF waveforms whose RPAP and RDR values are close to the ideal values, i.e., almost-compliant sequences. For example, if we allow RPAP to increase to 2.95 dB, two new independent sets of patterns will become available in addition to the set $\Theta^{(v)}$ defined previously.

Moreover, by expanding the search space for $s_i$'s of STFcompliant signals beyond QPSK, one may find other types of dependency patterns. Considering 8-PSK, for example, at least one new pattern was identified that was independent of the patterns that define the sequences with only QPSK symbols. For this pattern, RPAP≤2.27 dB and RDR≤12 dB, which are close to the ideal values.

Applications of P-Modulation

Embedding/modulating information in the frame preamble opens the door for several PHY-layer applications. Non-limiting examples of these applications include security and PHY-layer signaling. It is to be understood that these examples are not intended to limit the present invention in any way, and that the present invention may be used in other applications.

Security: The bit sequence embedded in the preamble may be used to represent a (time-varying) PHY-layer sender identifier, hence, facilitating full PHY-level frame encryption and preventing MAC spoofing attacks. Full-frame encryption is impossible in the absence of a PHY-layer identifier. The bit sequence may also represent the sender's time-varying digital signature (used to authenticate a link and prevent copycat/replay attacks) or the initialization vector for generating secret pilot subcarriers locations (to mitigate pilot tone jamming attacks in OFDM systems). In addition, time-varying preamble waveforms that change from one frame to another can mitigate the FO estimation attacks in OFDM systems that rely on the publicly known preamble signal to craft a jamming signal and efficiently disrupt the FO estimation process at the Rx. An example of a use case features the use of the embedded information for PHY-layer sender identification. Sender identification is a key functionality in any wireless network. It allows the Rx to distinguish between different transmitting nodes. Moreover, if nodes employ full-frame encryption for data confidentiality, sender identification is required at the Rx before the decryption can take place so as to look up the right decryption key. In this case, the Rx needs to receive a plaintext sender identifier at some header in the protocol stack before it can start the decryption process. For example, in IEEE WLAN standards, the globally unique MAC address at the link layer acts as the sender identifier. However, a link-layer identifier is extracted only after decoding the PHY-layer header. Thus, if the full frame is to be encrypted (including the PHY header), the MAC address cannot be used to look up the decryption key. In other words, the PHY-layer header cannot be decrypted until the MAC address has been obtained, creating a deadlock at the Rx. As a result, relying on a link-layer identifier necessitates transmitting the PHY-layer header in the clear. However, it has been shown that an adversary can fingerprint a device/user using PHY-layer header and can apply traffic analysis to disclose several private information, even if the frame payload is encrypted. Transmitting the PHY-layer header in the clear can also be exploited to launch various selective jamming attacks. Furthermore, a plaintext and predictable MAC identifier opens the door for MAC spoofing and/or unauthorized user tracking attacks. The case of trash cans in London in 2013 is an example of such attacks. The trash can suppliers had installed a device in the cans to collect information from smartphones of people walking in London's Square Mall, mostly based on PHY-layer header fields. The intention was to study customers' shopping habits and generate targeted advertisements. The seriousness of these tracking attacks has been recently acknowledged by IEEE and IETF, and accordingly, a new study group was formed to assess the privacy implications of visible MAC addresses and other link-layer privacy issues. To provide a more secure link-layer sender identification approach and prevent user tracking, this group suggested using random MAC addresses, generated based on a chain of unpredictable but unencrypted time-rolling identifiers. However, link-layer identification prevents full-frame encryption. In addition, MAC address randomization implementations on commercial devices (e.g., for hiding the true address in probe requests in Apple iOS 8.1.3) have been shown to exhibit several vulnerabilities. By employing P-modulation, those random identifiers can instead be used at the PHY layer, facilitating full-frame encryption. Such a PHY-layer identification can also replace existing inefficient PHY-layer sender identification methods (or sender authentication to defend against identity-based spoofing). For example, channel-based sender authentication schemes have been suggested in the literature. These schemes, however, are often impractical due to node mobility, correlated CSI (signature) in a vicinity of the Tx, and CSI estimation errors at the Rx. Hardware-based (radiometric) sender authentication schemes exploit the inherent device-specific manufacturing impairments for sender authentication. However, the inaccuracy in the measurements of COTS radios prevents successful implementation of these methods. In contrast, P-modulation offers a more reliable PHY-layer platform for sender identification (authentication), which is robust to node mobility and is independent of the CSI and Tx hardware.

PHY-layer Signaling: P-modulation can be used as a signaling mechanism for certain PHY-layer operations, which otherwise requires modifying existing header structures and introducing new fields. For example, the embedded bit sequence can be used to convey the operation mode of the Tx in full-duplex communications (e.g., transmit/receive vs. transmit/sense), the (frame-specific) pattern of traveling pilots proposed for the upcoming IEEE 802.11ah standard to improve channel estimation under high Doppler scenarios, or any PHY-layer field required for future applications that cannot be conveyed in the standard PHY-layer header. Alternatively, the embedded bits can be a part of the PHY header, merged into the preamble and removed from the frame (to reduce the frame duration). Such an approach increases the utilization of the frame by communicating a part of it through the preamble. In addition, P-modulation can enable the Tx to use a higher transmission rate for the PHY-layer header, which is transmitted at a known (often the lowest) rate in existing systems, and so reduce the frame duration via announcing this frame-specific rate in the preamble.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method for exploiting a preamble waveform of a frame preamble in an orthogonal frequency-division multiplexing ("OFDM") based wireless system to support protocol and security functions at a physical (PHY) layer by embedding time-varying user-defined information specific to said protocol and security functions into the preamble waveform, the method comprising:
   (a) introducing a new approach for creating a dependency pattern as a sequence of phase differences between successive subcarriers of an OFDM symbol;
   (b) generating a new set of dependency patterns, each pattern being a variation of an initial dependency pattern, wherein the initial dependency pattern is a sequence of phase differences between successive subcarriers of a standardized training signal (TS), wherein several identical versions of the standardized TSs comprise a standardized preamble waveform of a given wireless system;
   (c) selecting a secondary dependency pattern from a union of the new set of generated dependency patterns and from the initial dependency pattern;
   (d) identifying a subset of mutually independent dependency patterns that can be used to generate a number of backward-compatible TSs, wherein each dependency pattern in the subset is not a function of any other dependency pattern in the same subset; and
   (e) generating set of backward-compatible TSs by replacing the initial dependency pattern exhibited by a set of standardized TSs with the secondary dependency pattern, wherein replacing the initial dependency pattern results in a modified preamble waveform that is backward-compatible with a standardized receiver because the set of backward-compatible TSs adhere to a standardized periodicity requirement and the preamble waveform adheres to a standardized preamble-duration requirement, wherein the set of backward-compatible TSs have a period and a duration equal to a period and a duration of the set of standardized TSs, wherein the set of backward-compatible TSs have a peak-to-average-power ratio ("PAPR") and a dynamic range different than a PAPR and a dynamic range of the set of standardized TSs, wherein the PAPR and the dynamic range of the set backward-compatible TSs are acceptable to the standardized receiver, wherein each sequence of phase differences comprising the secondary dependency pattern conveys a functionality-specific value that needs to be conveyed in the modified preamble waveform via the set of backward-compatible TSs, wherein the standardized receiver processes and translates the functionality-specific value into a sequence of bits specific to the protocol and security functions defined by user.

2. The method of claim 1, wherein each TS of the set backward-compatible TSs in the modified preamble waveform is phase-shifted by a common phase value, wherein said phase-shift conveys a user-specified information in the preamble waveform.

3. The method of claim 1, wherein each TS of the set backward-compatible TSs is time-shifted by a common time value, wherein the common time value conveys a user-specified information in the preamble waveform.

4. The method of claim 1, wherein the OFDM-based wireless system is a multiple-input multiple-output ("MIMO") based wireless system, wherein the frame preamble comprises one or more sets of standardized TSs.

5. The method of claim 1, wherein the OFDM-based wireless system is an IEEE 802.11 wireless system, wherein each standardized TS is a short-training sequence ("STS"), wherein a first half of the preamble waveform comprises a short training field ("STF") comprising a fixed number of STSs.

6. The method of claim 1 further comprising a method for extracting at a wireless receiver the embedded time-varying user-defined information the method comprising:
   (a) detecting the initial dependency pattern or the secondary dependency pattern of the modified preamble waveform, wherein the initial or the secondary dependency patterns belong to a cluster of independent and dependent dependency patterns ("CDP"), wherein the CDP contains a plurality of patterns that can be converted to each other by adding a constant phase shift, wherein each dependency pattern of a CDP can be a time-shifted version of another dependency pattern in the CDP,
   wherein the detecting of the initial or the secondary dependency patterns use the correlation among subcarriers of a TS, wherein a detection accuracy is enhanced by using the repetitions of TS's within a preamble,
   wherein the independent CDP reveals a first part of the sequence of bits, wherein the plurality of dependency patterns belonging to the same independent CDP are ordered and indexed according to an amount of time shift, wherein an index of the detected dependency pattern in the CDP reveals a second part of the bit sequence; and
   (b) detecting an amount of phase shift using an estimated dependency pattern as a basis for an expected phase of each subcarrier comprising the set of backward-compatible TSs, wherein the estimation uses repetitions of said phase shift in the subcarriers of each backward-compatible TS, wherein the estimation is enhanced using repetitions of TSs.

7. A method for exploiting a preamble waveform, comprising a set of standardized training signals (TSs) of an OFDM-based frame preamble of a wireless system; said method allows the user of a transmitting device to embed a sequence of bits specific to protocol and security functions into the preamble waveform, the method comprising: time shifting each standardized TS of the preamble waveform by a common value resulting in a modified preamble waveform having a set of time-shifted TSs, wherein the set of time-shifted TSs has a period and a duration equal to a period and a duration of the set of standardized TSs of a given wireless standard, wherein the modified preamble waveform is backward-compatible with a standardized receiver, as the set of time-shifted TSs adhere to a periodicity requirement and the modified preamble waveform adheres to a preamble-duration requirement of the wireless standard adhered by at the given receiver, wherein the common value of time shift conveys a user-specified information in the modified preamble waveform via the set of time-shifted TSs, wherein the standardized receiver processes and translates the user-specified information into a sequence of bits specific to protocol and security functions in order to support user-defined network and protocol operation, wherein the method further comprising a method for extracting at a wireless receiver the sequence of bits embedded from the modified preamble waveform, the method comprising:

(a) detecting an initial dependency pattern or a secondary dependency pattern of the modified preamble waveform, wherein the initial or the secondary dependency pattern belongs to a cluster of independent and dependent dependency patterns ("CDP"), wherein the CDP contains a plurality of patterns that can be converted to each other by adding a constant phase shift, wherein each dependency pattern of a CDP can be a time-shifted version of another dependency pattern in the CDP, wherein the detecting of the initial or secondary dependency pattern uses the correlation among subcarriers of a TS, wherein a detection accuracy is enhanced by using the repetitions of TS's within a preamble, wherein the independent CDP reveals a first part of the sequence of bits, wherein the plurality of dependency patterns belonging to the same independent CDP are ordered and indexed according to an amount of time shift, wherein an index of the detected dependency pattern in the CDP reveals the second part of the bit sequence; and (b) detecting an amount of phase shift using an estimated dependency pattern as a basis for an expected phase of each subcarrier comprising a set of backward-compatible TSs, wherein the estimation uses repetitions of said phase shift in the subcarriers of each backward-compatible TS, wherein the estimation is enhanced using repetitions of TSs.

8. The method of claim 7, wherein the OFDM-based wireless system is a Long Term Evolution ("LTE") system, wherein the set of standardized TSs are primary synchronization signal ("PPS"), wherein a PPS is used to identify a cell identity using a frequency-domain Zadoff-Chu sequence, wherein the cell identity is an identifier of a physical LTE cell, wherein Zadoff-Chu sequence exhibits a zero cyclic autocorrelation at all nonzero lags, wherein a set of backward-compatible PPSs are generated by cyclic-shifting a set of standardized PPSs in time or frequency, wherein a standardized receiver extracts the cell identity via a standard procedure.

9. A method for exploiting a preamble waveform, comprising a set of standardized training signals (TSs), of a frame preamble in OFDM-based wireless systems to support protocol and security functions by embedding a sequence of bits specific to said protocol and security functions into a preamble waveform, the method comprising: phase shifting each standardized TS of the preamble waveform by a common value resulting in a modified preamble waveform having a set of phase-shifted TSs, wherein the set of phase-shifted TSs has a period and a duration equal to a period and a duration of the set of standardized TSs, wherein the modified preamble waveform is backward-compatible with a standardized receiver, as the set of phase-shifted TSs adheres to a periodicity requirement and the modified preamble waveform adheres to preamble-duration requirement, wherein the common value of phase shift conveys a user-specified value embedded into the modified preamble waveform via the set of phase-shifted TSs, wherein the standardized receiver processes and translates the user-specified information into a sequence of bits specific to protocol and security functions in order to support user-defined network and protocol operation, the method further comprising a method for extracting at a wireless receiver the sequence of bits embedded from the modified preamble waveform, the method comprising:

(a) detecting an initial dependency pattern or a secondary dependency pattern of the modified preamble waveform, wherein the initial or secondary dependency pattern belongs to a cluster of independent and dependent dependency patterns ("CDP"), wherein the CDP contains a plurality of patterns that can be converted to each other by adding a constant phase shift, wherein each dependency pattern of a CDP can be a time-shifted version of another dependency pattern in the CDP, wherein the detecting of the initial or the secondary dependency pattern uses the correlation among subcarriers of a TS, wherein a detection accuracy is enhanced by using the repetitions of TS's within a preamble, wherein the independent CDP reveals a first part of the sequence of bits, wherein the plurality of dependency patterns belonging to the same independent CDP are ordered and indexed according to an amount of time shift, wherein an index of the detected dependency pattern in the CDP reveals the second part of the bit sequence; and (b) detecting an amount of phase shift using an estimated dependency pattern as a basis for an expected phase of each subcarrier comprising a set of backward-compatible TSs, wherein the estimation uses repetitions of said phase shift in the subcarriers of each backward-compatible TS, wherein the estimation is enhanced using repetitions of TSs.

* * * * *